United States Patent
McMahan et al.

(10) Patent No.: US 11,668,124 B2
(45) Date of Patent: Jun. 6, 2023

(54) ENCAPSULATED BEARING BLOCK DESIGN FOR ADJUSTABLE HOOK LATCH

(71) Applicant: ROHR, INC., Chula Vista, CA (US)

(72) Inventors: Paul F. McMahan, Chula Vista, CA (US); David Louis Lipson, Chula Vista, CA (US); Jamie Salazar, Baja California (MX); Jose Roberto Aguilar, Baja California (MX)

(73) Assignee: Rohr, Inc., Chula Vista, CA (US)

( * ) Notice: Subject to any disclaimer, the term of this patent is extended or adjusted under 35 U.S.C. 154(b) by 225 days.

(21) Appl. No.: 17/132,489

(22) Filed: Dec. 23, 2020

(65) Prior Publication Data

US 2022/0195765 A1    Jun. 23, 2022

(51) Int. Cl.
   *E05C 19/14*    (2006.01)
   *B64D 29/06*    (2006.01)
   *E05B 63/00*    (2006.01)

(52) U.S. Cl.
   CPC ............ *E05C 19/145* (2013.01); *B64D 29/06* (2013.01); *E05B 63/0056* (2013.01); *Y10T 292/0917* (2015.04)

(58) Field of Classification Search
   CPC ........ E05C 19/145; E05C 19/10; E05C 19/12; E05C 19/14; B64D 29/06; B64D 29/08; B64D 29/00; B64D 29/02; B64D 29/04; E05B 41/00; E05B 63/0056; E05B 13/002; E05Y 2900/502; B64C 1/14; B64C 1/143; B64C 1/1469; B64C 7/02; B64C 1/1446;

(Continued)

(56) References Cited

U.S. PATENT DOCUMENTS 2,904,141 A * 9/1959 Henrichs ................ B64D 29/06
                                          292/108
4,183,564 A * 1/1980 Poe ....................... E05C 19/145
                                          292/DIG. 31

(Continued)

FOREIGN PATENT DOCUMENTS

WO     2020159920        8/2020
WO     WO-2020159920 A1 * 8/2020   ............. B64D 29/06

OTHER PUBLICATIONS

European Patent Office; European Search Report dated May 27, 2022 in application No. 21211334.4.

*Primary Examiner* — Kristina R Fulton
*Assistant Examiner* — Tal Saif
(74) *Attorney, Agent, or Firm* — Snell & Wilmer L.L.P.

(57) ABSTRACT

A latch mechanism includes a hook body having a hook body load bearing plate; a hook mechanism, the hook mechanism having a hook with a threaded shaft, the shaft defining a longitudinal axis with respect to the hook body; an adjustment mechanism configured to adjust an axial position of the hook with respect to the hook body; and a bearing block, the bearing block having a block load bearing plate disposed between the adjustment mechanism and the hook body load bearing plate, the bearing block including a first boss configured for engagement with the adjustment mechanism, a second boss configured for engagement with the hook body plate aperture, an inner diameter hole that allows the hook shaft threads to engage with the adjustment mechanism but provides suitable clearance within the second boss inner diameter to prevent the hook shaft threads from bearing out as required in Aerospace design.

20 Claims, 6 Drawing Sheets

(58) Field of Classification Search
CPC ............. B64C 1/1407; Y10T 292/0886; Y10T 292/089; Y10T 292/0911; Y10T 292/0913; Y10T 292/0917; Y10T 292/0949; Y10T 292/0914; Y10T 292/0946
See application file for complete search history.

(56) References Cited

U.S. PATENT DOCUMENTS

| | | | | |
|---|---|---|---|---|
| 4,320,912 A * | 3/1982 | Grace | ................... | E05B 15/025 292/341.18 |
| 4,478,446 A * | 10/1984 | Duran | ................... | E05B 15/025 292/113 |
| 4,530,529 A * | 7/1985 | Poe | ....................... | E05B 15/025 292/DIG. 31 |
| 4,798,408 A * | 1/1989 | Harmon | ................. | E05B 15/025 292/341.18 |
| 5,620,212 A * | 4/1997 | Bourne | ................. | E05C 19/145 292/DIG. 31 |
| 5,984,382 A | 11/1999 | Bourne et al. | | |
| 8,870,149 B2 * | 10/2014 | Rodig | ................... | B64D 47/00 403/322.2 |
| 9,273,488 B1 * | 3/2016 | Yu | ........................... | B64D 29/06 |
| 9,567,784 B2 * | 2/2017 | Defrance | .............. | E05C 19/145 |
| 10,173,782 B2 | 1/2019 | Hernandez | | |
| 10,443,279 B2 * | 10/2019 | Kim | ........................ | E05C 19/14 |
| 10,760,304 B2 * | 9/2020 | Do | ........................ | E05C 19/145 |
| 2011/0227350 A1 * | 9/2011 | Do | ........................ | E05C 19/145 292/105 |
| 2013/0328326 A1 * | 12/2013 | DeFrance | .............. | B64D 29/06 292/114 |
| 2017/0260782 A1 * | 9/2017 | Kim | ...................... | E05B 13/002 |
| 2018/0128028 A1 * | 5/2018 | Hernandez | .............. | E05B 53/00 |
| 2021/0300579 A1 * | 9/2021 | Artin | ..................... | E05B 15/022 |

\* cited by examiner

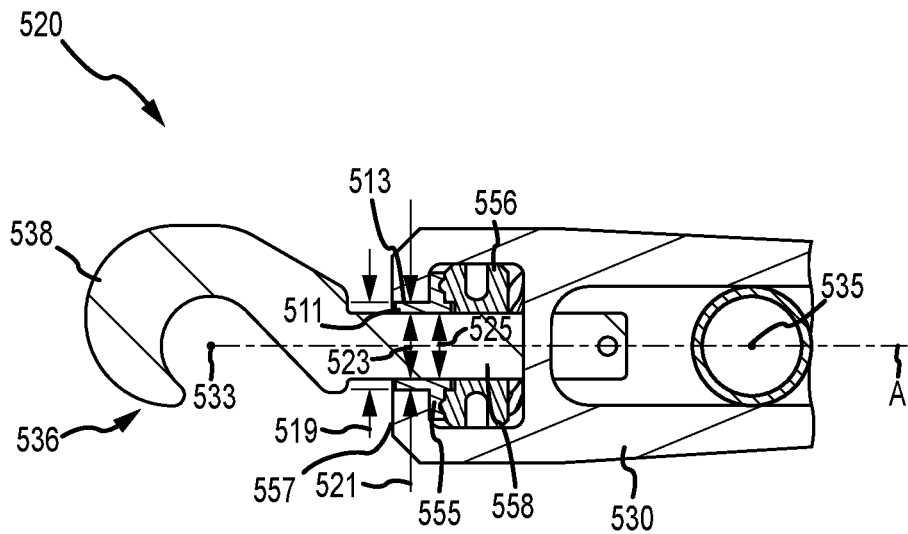
FIG.5A
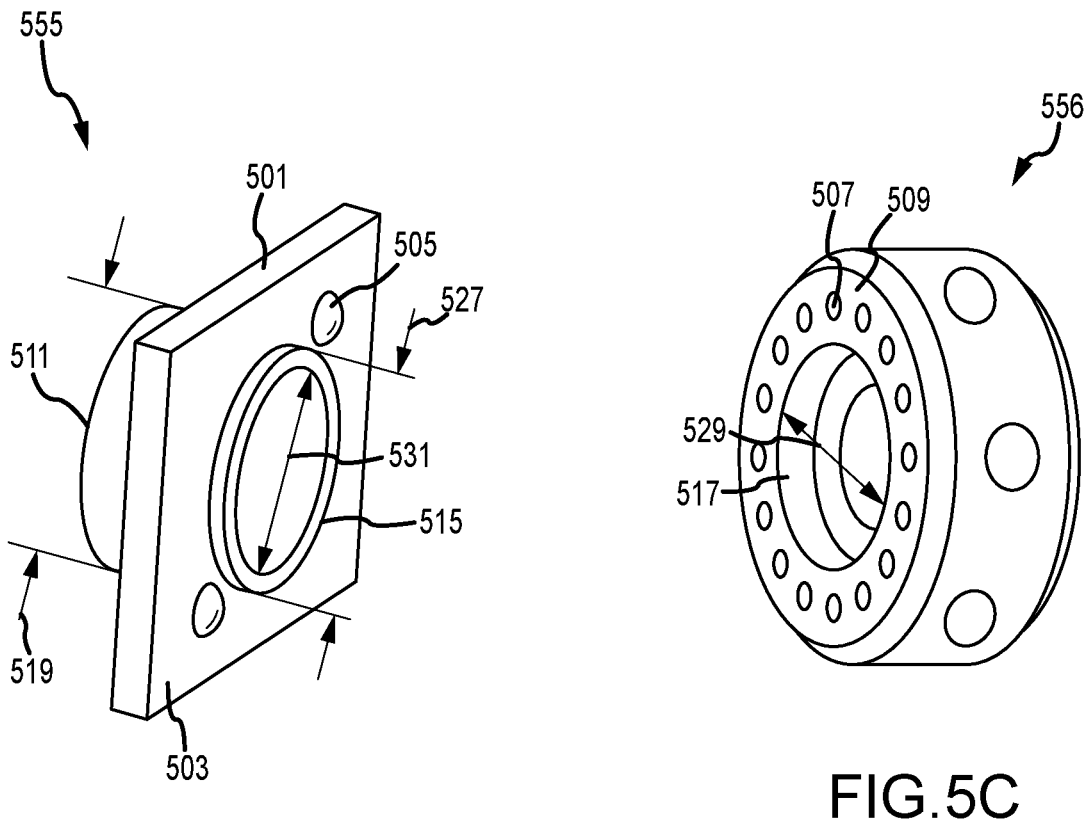
FIG.5B
FIG.5C

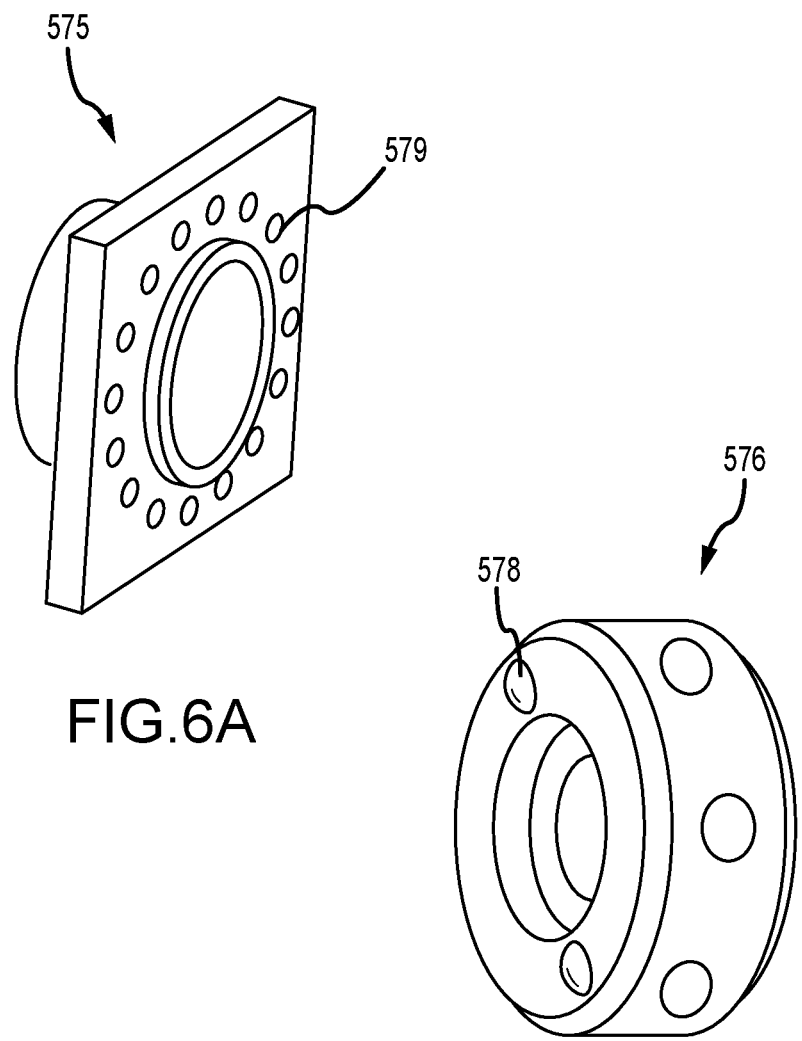

ENCAPSULATED BEARING BLOCK DESIGN FOR ADJUSTABLE HOOK LATCH

FIELD

The present disclosure relates generally to latch mechanisms and, more particularly, to aircraft latch mechanisms exhibiting anti-rotation and alignment features.

BACKGROUND

Various latching mechanisms exist for use in aircraft as aircraft have many components, such as fuselage panels, including cowlings and the like, which must be opened and closed securely. For example, tension latches mounted on a first panel are typically configured to cinch to a keeper on a second panel to hold the first panel, which may be a moveable panel, closed relative to the second panel. Other latches include sliding toggle linkages to minimize the kinematic envelope of the latch. These linkages rotate around a mounting pin to produce the latch reach. The complexity of certain aircraft latches makes them relatively large and heavy, which is disfavored on aircraft. Accordingly, it is desirable to provide a latch having a reduced size and weight, but that exhibits the strength and other features of larger and heavier latches.

SUMMARY

A latch mechanism is disclosed. In various embodiments, the latch mechanism includes a hook body, the hook body having a hook body load bearing plate; a hook mechanism, the hook mechanism having a hook with a threaded shaft, the shaft defining a longitudinal axis with respect to the hook body; an adjustment mechanism configured to adjust an axial position of the hook with respect to the hook body; and a bearing block, the bearing block having a block load bearing plate disposed between the adjustment mechanism and the hook body load bearing plate, the bearing block including a first boss configured for engagement with the adjustment mechanism, a second boss configured for engagement with the hook body plate aperture, an inner diameter hole that allows the hook shaft threads to engage with the adjustment mechanism but provides suitable clearance within the second boss inner diameter to prevent the hook shaft threads from bearing out as required in Aerospace design. Furthermore, the bearing block provides axial alignment for multiple structural components as the bearing block load bearing plate disposed between the adjustment mechanism and the hook body load bearing plate with included hollowed out bosses mates the aforementioned component parts providing axial alignment of the hook shaft, hook body plate aperture, and adjustment mechanism (nut) about the center of aperture of the bearing block.

In various embodiments, the hook body includes a plate aperture that extends in an axial direction through the hook body load bearing plate. In various embodiments, the bearing block includes a second boss configured for engagement with the plate aperture. In various embodiments, the second boss defines a second boss outer diameter and the plate aperture defines a plate aperture inner diameter, the plate aperture inner diameter being within a press-fit tolerance of the second boss outer diameter. In various embodiments, the press-fit tolerance is between one or two thousandths of an inch.

In various embodiments, the bearing block first boss is configured to engage a recess within the adjustment mechanism. In various embodiments, the adjustment mechanism includes an adjustment nut configured for threaded engagement with the hook shank threads. In various embodiments, the bearing block includes a second boss, the second boss defining a second boss inner diameter, and wherein the hook shank threads defines an outer diameter, the hook shank thread outer diameter having sufficient clearance within the second boss inner diameter as to prevent the hook shank threads from bearing on the smooth second boss inner diameter as is a requirement in Aerospace design. Furthermore, in various embodiments, the adjustment mechanism and the block load bearing plate are configured to provide a lock mechanism, the lock mechanism being configured to prevent rotation of the adjustment mechanism about the longitudinal axis.

A latch mechanism for an aircraft panel is disclosed. In various embodiments, the latch mechanism includes a hook body, the hook body including a plurality of longitudinal members, each of the plurality of longitudinal members extending in an axial direction with respect to the hook body, the hook body further having a hook body load bearing plate connected to the plurality of longitudinal members and being oriented perpendicular to the axial direction; a hook mechanism, the hook mechanism having a hook with a threaded shaft, the shaft extending in the axial direction with respect to the hook body; an adjustment mechanism configured to adjust an axial position of the hook with respect to the hook body; and bearing block, the bearing block having a load bearing plate disposed between the adjustment mechanism and the hook body load bearing plate with included hollowed out bosses that allows for axial alignment of the hook shaft, hook body plate aperture, and adjustment mechanism(nut) about the center of aperture of the bearing block.

In various embodiments, the hook body includes a plate aperture that extends in the axial direction through the hook body load bearing plate. In various embodiments, the bearing block includes a first boss configured for engagement with the plate aperture. In various embodiments, the first boss defines a first boss outer diameter and the plate aperture defines a plate aperture inner diameter, the plate aperture inner diameter being within a press-fit tolerance of the first boss outer diameter. In various embodiments, the press-fit tolerance is between one or two thousandths of an inch.

In various embodiments, the bearing block includes a second boss configured for engagement with the adjustment mechanism. In various embodiments, the adjustment mechanism includes an adjustment nut configured for threaded engagement with the shaft. In various embodiments, the first boss defines a first boss inner diameter and the shaft defines a shaft outer diameter, the shaft outer diameter being within a sliding-fit tolerance of the first boss inner diameter. In various embodiments, the sliding tolerance is between five and ten thousandths of an inch. In various embodiments, the adjustment mechanism and the block load bearing plate are configured to provide a lock mechanism, the lock mechanism being configured to prevent rotation of the adjustment mechanism about the axial direction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 5A, 5B and 5C provide side and perspective schematic illustrations of a portion of a latch mechanism, a bearing block and an adjustment nut, in accordance with various embodiments; and FIGS. 6A and 6B provide perspective schematic illustrations of a bearing block and an adjustment nut, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
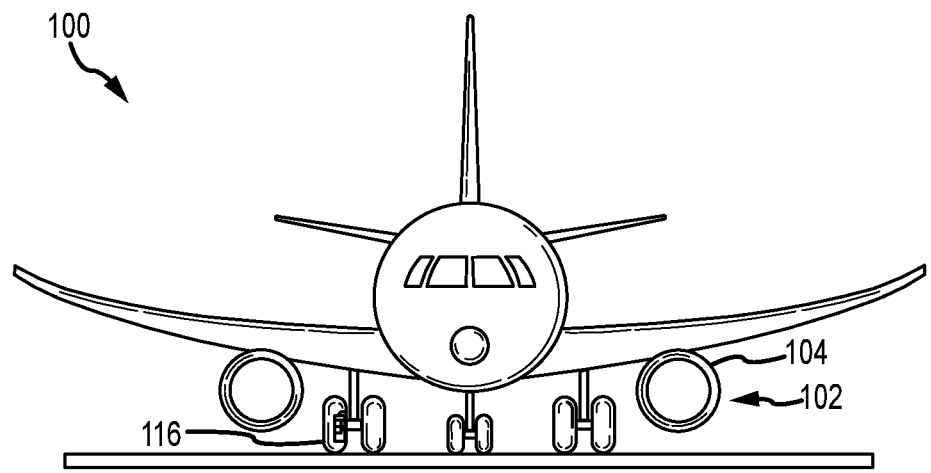
FIGS. 1A and 1B provide schematic illustrations of an aircraft having and aircraft propulsion system, in accordance with various embodiments.
Figure 1B:
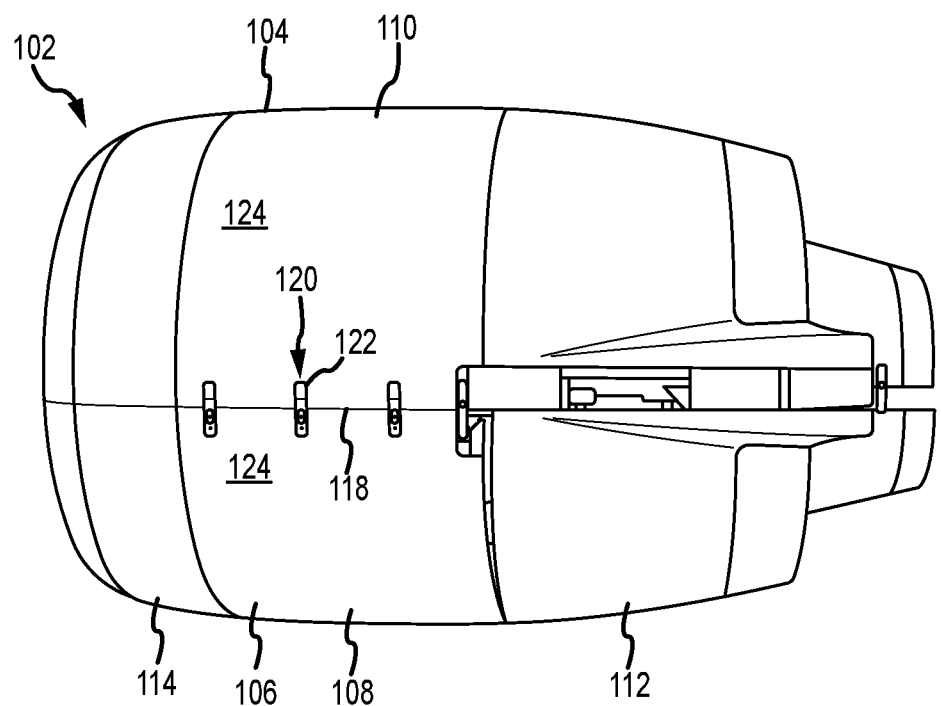

Referring now to the drawings, FIGS. 1A and 1B provide schematic illustrations of an aircraft 100 having and an aircraft propulsion system 102, in accordance with various embodiments. The aircraft propulsion system 102 may include various systems, such as, for example, a gas turbine engine system housed within a nacelle 104. The nacelle 104 typically comprises a plurality of aerodynamic panels, such as, for example, one or more core cowl panels 106 (e.g., a first core cowl panel 108 and a second core cowl panel 110), one or more thrust reverser panels 112 and one or more fan cowl panels 114, each of which may be removable, hinged, or otherwise configurable to enable access to internal components of the aircraft 100 or the aircraft propulsion system 102. The aircraft 100 may also include various additional systems, such as, for example, one or more landing gear 116, which generally support the aircraft 100 when the aircraft 100 is not flying, allowing the aircraft 100 to taxi, takeoff or land without damage.

In various embodiments and with additional reference to the nacelle 104 illustrated in FIG. 1B, the first core cowl panel 108 and the second core cowl panel 110 are coupled, in various embodiments, along a seam 118 by a latch mechanism 120 (or a plurality of latch mechanisms). In the latched state, a latch handle 122 of the latch mechanism 120 may sit relatively flush or may be recessed within an aerodynamic panel surface 124 defined by the first core cowl panel 108 and the second core cowl panel 110. In the unlatched state, the latch handle 122 of the latch mechanism 120 may protrude above or outside of the aerodynamic panel surface 124. While the foregoing description of the latch mechanism 120 is presented with reference to the first core cowl panel 108 and the second core cowl panel 110, a similar description may be provided with reference to other panel assemblies of the aircraft 100 or the aircraft propulsion system 102, including, for example, the one or more thrust reverser panels 112 and the one or more fan cowl panels 114.

Figure 2:
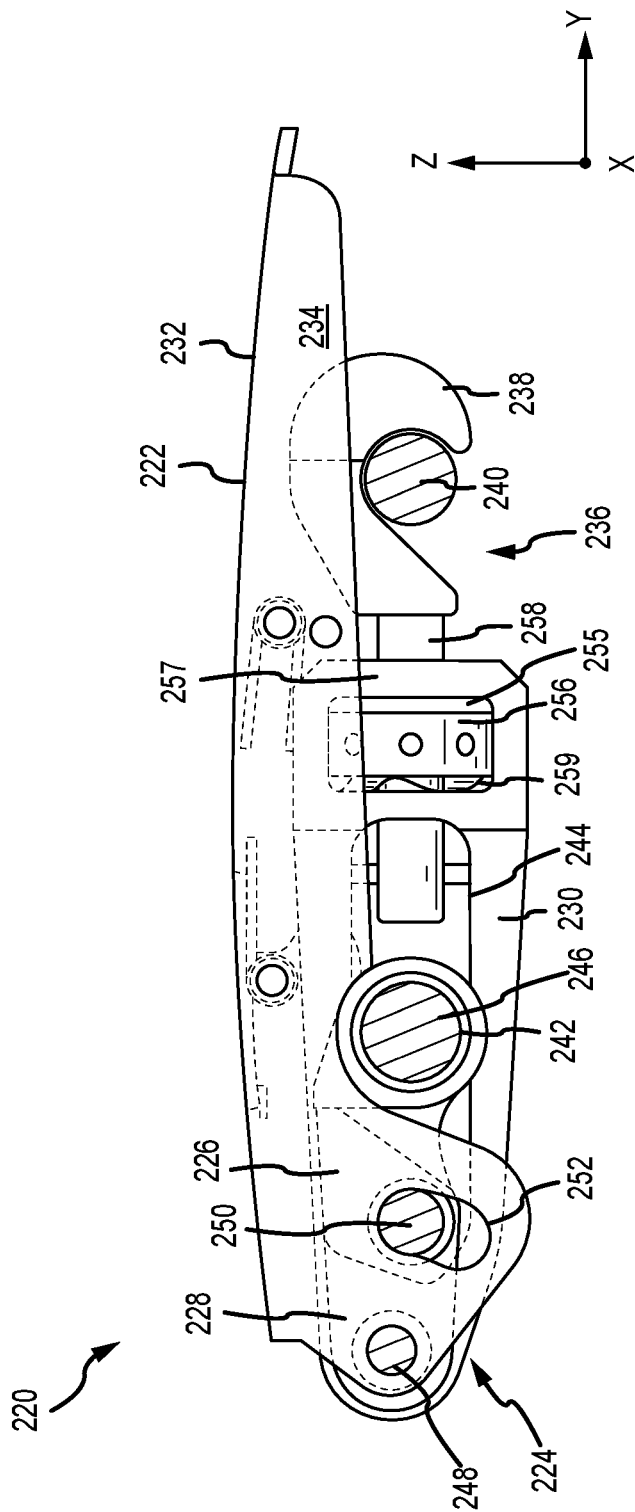
FIG. 2 provides a schematic illustration of a latch mechanism, in accordance with various embodiments.

Referring now to FIG. 2, a latch mechanism 220 (e.g., a latch mechanism for an aircraft panel), similar to the latch mechanism 120 described above with reference to FIG. 1B, is illustrated and its operation described. The latch mechanism 220 comprises a latch handle 222 coupled to a latch linkage 224 and a hook body 230. In various embodiments, the latch linkage 224 includes a first link 226 (or a forward link) and a second link 228 (or an aft link). The latch handle 222 includes an upper surface 232 extending between a first face 234 and a second face (opposite the first face 234) to define, in cross section through the ZX-plane, a relatively U-shaped latch handle. The latch mechanism 220 also includes a hook mechanism 236, including a hook 238 adjustably coupled (i.e., in the Y-direction or a longitudinal direction) to the hook body 230, configured to removably couple with a mating pin 240 coupled to a cowl panel, such as, for example, the first core cowl panel 108 (or the second core cowl panel 110) described above. The first link 226 is configured to pivot about an axle 242 and to slide in an axial direction (i.e., in the Y-direction) with respect to an axial cutout 244 of the hook body 230. The axle 242 extends through the axial cutout 244 and is typically connected to a cowl panel, such as, for example, the second core cowl panel 110 described above, via a first pin 246 (or a forward pin) that extends through the axle 242. The second link 228 is pivotally connected to the latch handle 222 and to the hook body 230 via a second pin 248 (or an aft pin), while both the first link 226 and the second link 228 are pivotally connected to each other via a third pin 250.

In operation, (e.g., when decoupling the first core cowl panel 108 and the second core cowl panel 110), the latch handle 222 is rotated about the second pin 248 and away from the hook body 230, causing the first link 226 and the second link 228 to articulate with respect to each other about the third pin 250. The mutual articulation about the third pin 250, caused by engagement of a channel 252 cut into the latch handle 222 with the third pin 250, thereby further causes the hook body 230, together with the hook mechanism 236, to be urged in an axial direction (i.e., the Y-direction) with respect to the first pin 246, which remains stationary with respect to the cowl panel to which the latch mechanism 220 is connected (e.g., the second core cowl panel 110). Once the hook mechanism 236 or the hook 238 is decoupled from the mating pin 240, the first core cowl panel 108 and the second core cowl panel 110 may be decoupled. Coupling the first core cowl panel 108 and the second core cowl panel 110 is accomplished by reversing the operational steps above described.

In various embodiments, the coupling and decoupling of the latch mechanism 220 to the mating pin 240 may be adjusted by adjusting the location of the hook 238 with respect to the hook body 230 using an adjustment mechanism 254 that comprises, for example, an adjustment nut 256 threadedly coupled to a shaft 258 that is connected to the hook 238. Rotating the adjustment nut 256 in a first direction, for example, increases the distance (or axial position) between the hook 238 and the hook body 230, while rotating the adjustment nut 256 in a second direction decreases the distance (or axial position) between the hook 238 and the hook body 230. In various embodiments, a bearing block 255 is positioned between the adjustment nut 256 and a hook body load bearing plate 257 of the hook body 230, while a bias element 259 (e.g., a wave spring) is disposed aft of the adjustment nut 256 and configured to bias the adjustment nut 256 toward the bearing block 255 and the hook body load bearing plate 257 when the latch mechanism 220 assumes a decoupled or an unloaded state.

Figure 3A:
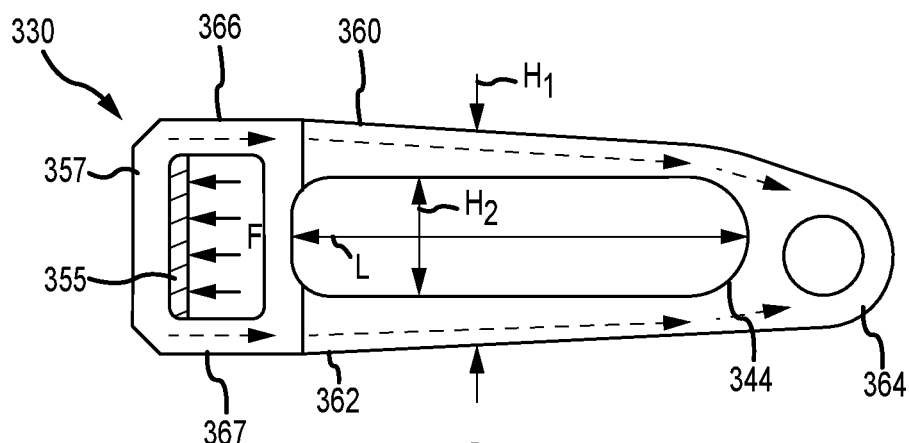
FIGS. 3A and 3B provide side and overhead schematic illustrations of a hook body, in accordance with various embodiments.
Figure 3B:
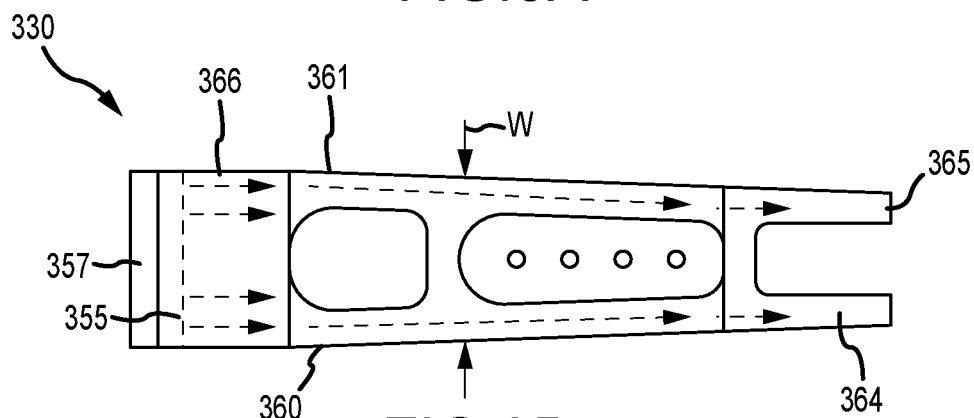
Figure 3C:
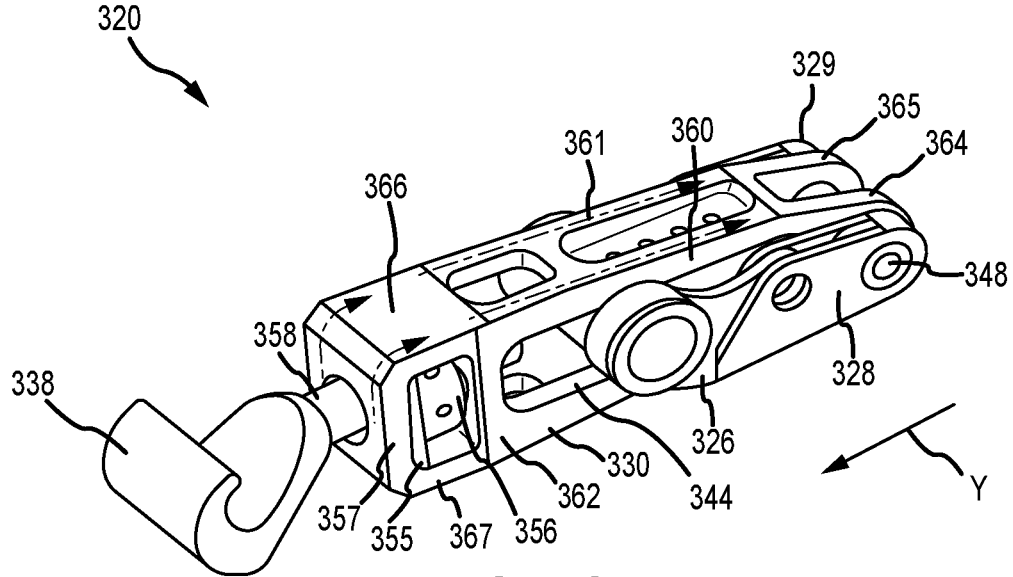
FIG. 3C provides a perspective schematic illustration of a latch mechanism, in accordance with various embodiments.

Referring now to FIGS. 3A, 3B and 3C, various schematic views of a latch mechanism 320, or components thereof, similar to the latch mechanism 220 above described, are provided. Referring to FIGS. 3A and 3B, for example, a side view and an overhead view, respectively, of a hook body 330, similar to the hook body 230 described above, are provided, while a perspective view of various components of the latch mechanism 320, including the hook body 330, is provided in FIG. 3C. Referring more specifically to the hook body 330, the hook body includes a first upper longitudinal beam 360 and a first lower longitudinal beam 362 and a second upper longitudinal beam 361 and a second lower longitudinal beam (hidden) (or a plurality of longitudinal members). By longitudinal, the disclosure contemplates the various beams being parallel with a longitudinal direction Y (e.g., the Y-direction shown in FIG. 2) or within a deviation ranging between about zero degrees (0°) and about twenty (20°) from being parallel to the longitudinal direction (e.g., the deviation being in the Z or X directions shown in FIG. 2). The first upper longitudinal beam 360 and the first lower longitudinal beam 362 are connected to a first aft flange 364, while the second upper longitudinal beam 361 and the second lower longitudinal beam are connected to a second aft flange 365. The first aft flange 364 and the second aft flange 365 are coupled to a first aft link 328 and a second aft link 329, respectively, via an aft pin 348, similar to the second pin 248 (or aft pin) described above, which is also coupled to a latch handle, similar to the latch handle 222 described above. Note that by reference to "longitudinal beam," the disclosure contemplates the various longitudinal beams being substantially straight and running parallel with respect to the longitudinal direction or within a deviation ranging between about zero degrees (0°) and about twenty (20°) from running parallel to the longitudinal direction.

In similar fashion, the first upper longitudinal beam 360 and the second upper longitudinal beam 361 are connected to a forward upper plate 366, while the first lower longitudinal beam 362 and the second lower longitudinal beam are connected to a forward lower plate 367. The forward upper plate 366 and the forward lower plate 367 are connected to a hook body load bearing plate 357, similar to the hook body load bearing plate 257 described above. Also similar to the description above, the latch mechanism 320 includes an adjustment nut 356 threadedly engaged with a shaft 358 that is connected to a hook 338. A bearing block 355 is positioned between the adjustment nut 356 and the hook body load bearing plate 357. In various embodiments, the bearing block 355 receives the axial load place on the adjustment nut 356 when the latch mechanism 320 assumes a deployed or a loaded state and distributes the load throughout the hook body load bearing plate 357. As described further below, the distributed load is then transferred via the longitudinal beams to the first aft flange 364 and to the second aft flange 365 and ultimately to the aft pin 348 via an efficient load transfer design of the hook body 330.

Still referring to FIGS. 3A-3C, the load paths resulting from a load placed on the latch mechanism 320 are illustrated. When an axial load (a tensile load) is placed on the shaft 358, a compressive load F is translated through the bearing block 355 and into the hook body load bearing plate 357. The compressive load on the hook body load bearing plate 357 is then translated into tensile loads that are distributed throughout the various structural components of the hook body 330. As illustrated by the dashed arrows, for example, the tensile load is distributed and translated through the forward upper plate 366 and the forward lower plate 367 and then through, respectively, the first upper longitudinal beam 360 and the second upper longitudinal beam 361 and the first lower longitudinal beam 362 and the second lower longitudinal beam. The tensile load is then distributed and translated through the first aft flange 364 and to the second aft flange 365 and ultimately to the aft pin 348.

As illustrated, the tensile load distributed and translated throughout the hook body 330 occurs without experiencing local stress concentrations, due primarily to the box-like structure of the hook body 330. More specifically, each of the first upper longitudinal beam 360, the second upper longitudinal beam 361, the first lower longitudinal beam 362 and the second lower longitudinal beam are oriented essentially in the axial direction, from the forward upper plate 366 and the forward lower plate 367 to the first aft flange 364 and to the second aft flange 365. In other words, the hook body 330 does not exhibit any elements within the structure where the load paths deviate substantially from the axial direction, which is the same direction the load paths traverse. In various embodiments, the box-like structure that results in the efficient load path described above is a result of the hook body 330 having a constant or essentially constant height $H_1$ (or hook body height) and a constant or essentially constant width W (or hook body width), both of which are essentially orthogonal to the axial load paths extending through the various structural elements above described. Further, an axial cutout 344, similar to the axial cutout 244 described above with reference to FIG. 2, also exhibits an essentially longitudinal or axial configuration. As illustrated in FIG. 3A, for example, the axial cutout 344 exhibits a constant or essentially constant height $H_2$ (or axial cutout height) along an axial length L of the axial cutout 344.

Figure 4A:
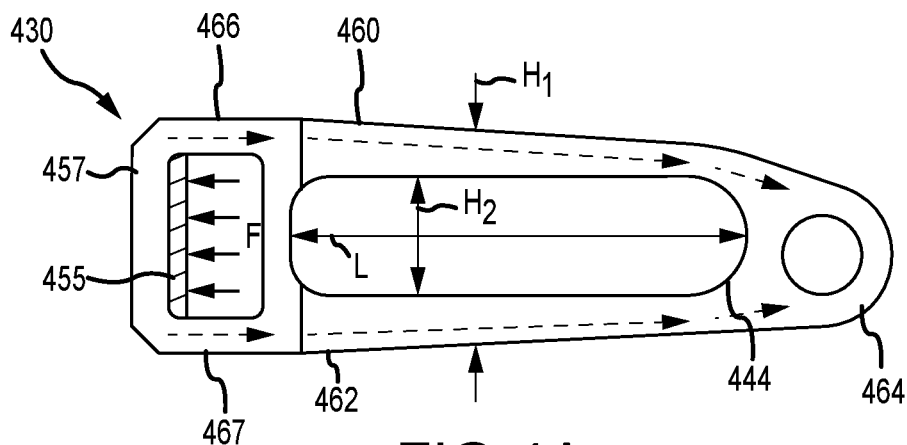
FIGS. 4A, 4B and 4C provide side and perspective schematic illustrations of a portion of a latch mechanism, a bearing block and an adjustment nut, in accordance with various embodiments.
Figure 4B:
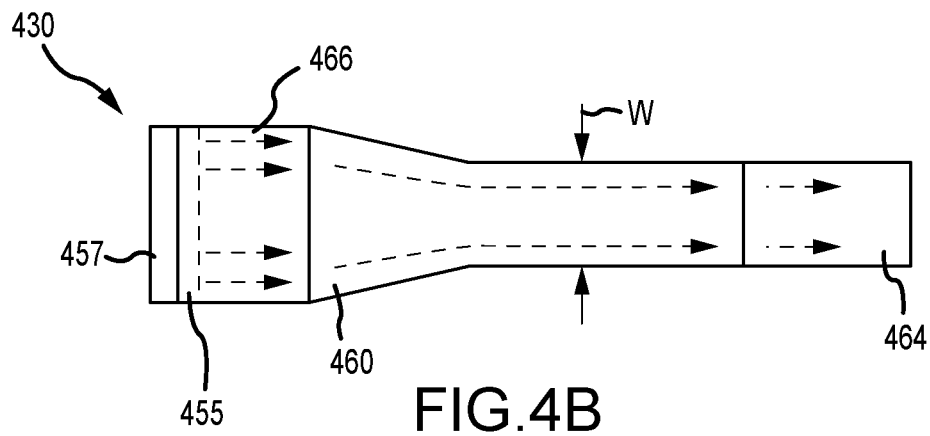
Figure 4C:
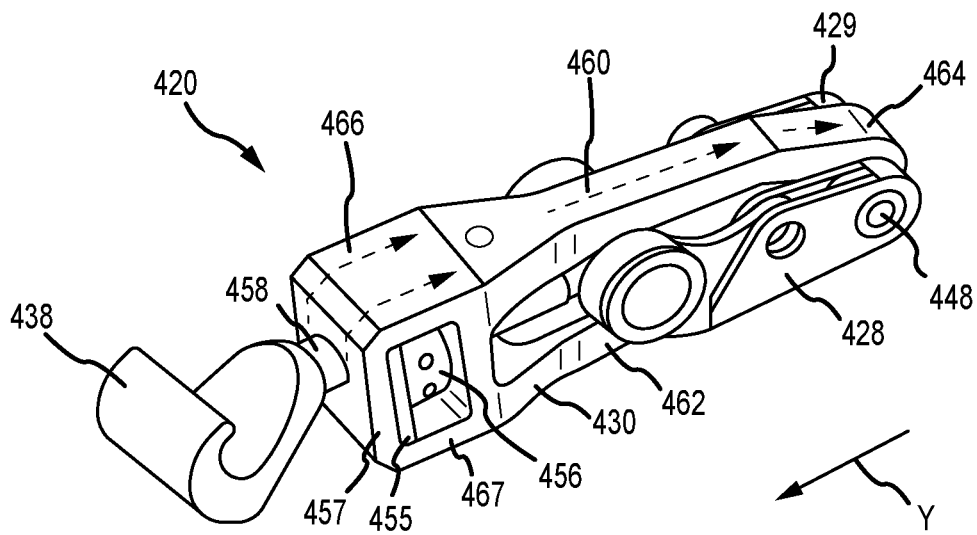

Referring now to FIGS. 4A, 4B and 4C, various schematic views of a latch mechanism 420, or components thereof, similar to the latch mechanism 220 and the latch mechanism 320 above described, are provided. Referring to FIGS. 4A and 4B, for example, a side view and an overhead view, respectively, of a hook body 430, similar to the hook body 230 and the hook body 330 described above, are provided, while a perspective view of various components of the latch mechanism 420, including the hook body 430, is provided in FIG. 4C. Referring more specifically to the hook body 430, the hook body includes an upper longitudinal beam 460 and a lower longitudinal beam 462 (or a plurality of longitudinal members). The upper longitudinal beam 460 and the lower longitudinal beam 462 are connected to an aft flange 464. The aft flange 464 is coupled to a first aft link 428 and a second aft link 429 via an aft pin 448, similar to the second pin 248 (or aft pin) described above, which is also coupled to a latch handle, similar to the latch handle 222 described above. Similar to the above description, the disclosure contemplates the various beams being parallel with a longitudinal direction Y (e.g., the Y-direction shown in FIG. 2) or within a deviation ranging between about zero degrees (0°) and about twenty (20°) from being parallel to the longitudinal direction (e.g., the deviation being in the Z or X directions shown in FIG. 2). Further, by reference to "longitudinal beam," the disclosure contemplates the various longitudinal beams being substantially straight and running parallel with respect to a longitudinal direction or within a deviation ranging between about zero degrees (0°) and about twenty (20°) from running parallel to the longitudinal direction.

In similar fashion, the upper longitudinal beam 460 is connected to a forward upper plate 466, while the lower longitudinal beam 462 is connected to a forward lower plate 467. The forward upper plate 466 and the forward lower plate 467 are connected to a hook body load bearing plate 457, similar to the hook body load bearing plate 257 and to the hook body load bearing plate 357 described above. In various embodiments, the forward upper plate 466 lies or is disposed within an upper plane that is substantially perpendicular to the hook body load bearing plate 457 and extends in the longitudinal direction away from the load bearing plate (i.e., toward an aft direction). Similarly, the forward lower plate 467 lies or is disposed within a lower plane that is substantially perpendicular to the hook body load bearing plate 457 and extends in the longitudinal direction away from the load bearing plate (i.e., toward the aft direction). Also similar to the description above, the latch mechanism 420 includes an adjustment nut 456 threadedly engaged with a shaft 458 that is connected to a hook 438. A bearing block 455 is positioned between the adjustment nut 456 and the hook body load bearing plate 457. In various embodiments, the bearing block 455 receives the axial load placed on the adjustment nut 456 when the latch mechanism 420 assumes a deployed or a loaded state and distributes the load throughout the hook body load bearing plate 457. As described further below, the distributed load is then transferred via the longitudinal beams to the aft flange 464 and ultimately to the aft pin 448 via an efficient load transfer design of the hook body 430.

Still referring to FIGS. 4A, 4B and 4C, the load paths resulting from a load placed on the latch mechanism 420 are illustrated. When an axial load (a tensile load) is placed on the shaft 458, a compressive load F (e.g., as illustrated in FIG. 4A) is translated through the bearing block 455 and into the hook body load bearing plate 457. The compressive load on the hook body load bearing plate 457 is then translated into tensile loads that are distributed throughout the various structural components of the hook body 430. As illustrated by the dashed arrows, for example, the tensile load is distributed and translated through the forward upper plate 466 and the forward lower plate 467 and then through, respectively, the upper longitudinal beam 460 and the lower longitudinal beam 462. The tensile load is then distributed and translated through the aft flange 464 and ultimately to the aft pin 448.

As illustrated, the tensile load distributed and translated throughout the hook body 430 occurs without experiencing local stress concentrations, due primarily to the box-like structure of the hook body 430. More specifically, each of the upper longitudinal beam 460 and the lower longitudinal beam 462 are oriented essentially in the axial direction, from the forward upper plate 466 and the forward lower plate 467 to the aft flange 464. In other words, the hook body 430 does not exhibit any elements within the structure where the load paths deviate substantially from the axial direction. In various embodiments, the box-like structure that results in the efficient load path described above is a result of the hook body 430 having a constant or essentially constant height $H_1$ (or hook body height) and a constant or essentially constant width W (or hook body width), both of which are essentially orthogonal to the axial load paths extending through the various structural elements above described. Further, an axial cutout 444, similar to the axial cutout 244 and the axial cutout 344 described above, also exhibits an essentially longitudinal or axial configuration. As illustrated in FIG. 4A, for example, the axial cutout 444 exhibits a constant or essentially constant height $H_2$ (or axial cutout height) along an axial length L of the axial cutout 444.

Referring now to FIGS. 5A, 5B and 5C, side and perspective schematic illustrations of a portion of a latch mechanism 520, a bearing block 555 and an adjustment nut 556 are provided, in accordance with various embodiments. The latch mechanism 520 includes a hook body 530 having similar structural elements and characteristics as the hook body 330 or the hook body 430 described above, so those elements and characteristics are not repeated here. Referring primarily to the bearing block 555, the bearing block 555 includes a block load bearing plate 501 having a first side 503 (or an aft side) and a protrusion 505 (or a plurality of protrusions) configured to engage an aperture 507 (or one of a plurality of apertures) that extends into a first side 509 (or a forward side) of the adjustment nut 556. In various embodiments, the protrusion 505 and the aperture 507 are configured to define a lock mechanism (e.g., a detent mechanism) that locks or maintains the position of the adjustment nut 556 with respect to the bearing block 555 or, in other words, selectively prevents rotation of an adjustment mechanism (e.g., the adjustment nut 556) about the longitudinal axis. The bearing block 555 further includes a first boss 515 (or an aft boss) configured to engage a recess 517 that extends axially (e.g., in an axial direction along a longitudinal axis A) into the first side 509 of the adjustment nut 556 and a second boss 511 (or a forward boss) configured to engage a plate aperture 513 that extends axially through a hook body load bearing plate 557 of the hook body 530. With brief reference to FIGS. 6A and 6B, note that the lock mechanism above described may be reversed, such that a bearing block 575 may include an aperture 579 (or a plurality of apertures) that extends into the block load bearing plate, while an adjustment nut 576 may include a protrusion 578 (or a plurality of protrusions) configured to engage the aperture 579 (or one of the plurality of apertures).

Referring now to the second boss 511, an outer diameter 519 of the second boss 511 (or a second boss outer diameter) is defined and configured to tightly engage an interior surface of the plate aperture 513, where the interior surface of the plate aperture 513 is defined by an inner diameter 521 (or a plate aperture inner diameter). In various embodiments, the inner diameter 521 of the plate aperture 513 and the outer diameter 519 of the second boss 511 define a press-fit tolerance of within five or ten thousandths of an inch (≈125 to 250 microns) or, in various embodiments, within one or two thousandths of an inch (≈25 to 50 microns). Similarly, an inner diameter 523 of the second boss 511 (or a second boss inner diameter) and an outer diameter 525 of a shaft 558 (or a shaft outer diameter) coupled to a hook 538, where the shaft 558 and the hook 538 comprise a hook mechanism 536, define a suitable sliding-fit tolerance of within twenty or forty thousandths of an inch (≈500 to 1000 microns) or, in various embodiments, within five or ten thousandths of an inch (≈125 to 250 microns) clearance as to prevent the hook shaft threads from bearing out in the second boss inner diameter. Note the outer diameter 525 of the shaft 558 may be based on an outer diameter of a threaded shaft, the important feature being the shaft 558 is configured to slide axially or longitudinally within the second boss 511 without substantial lateral movement with respect to the longitudinal axis A and without bearing against the second boss 511. Note as well that the hook 538 and the shaft 558 are described as separate components, the disclosure contemplates the two components can be and has been described as being a single-piece, monolithic component.

Referring now to the first boss 515, an outer diameter 527 of the first boss 515 is defined and configured to engage an interior surface of the recess 517 of the adjustment nut 556, where the interior surface of the recess 517 is defined by an inner diameter 529. In various embodiments, the inner diameter 529 of the recess 517 and the outer diameter 527 of the first boss 515 define a sliding-fit tolerance of within twenty or forty thousandths of an inch (≈500 to 1000 microns) or, in various embodiments, within five or ten thousandths of an inch (≈125 to 250 microns). An inner diameter 531 of the first boss 515 is typically equal to the inner diameter 523 of the second boss 511, which provides the same sliding-fit tolerance of within twenty or forty thousandths of an inch (≈500 to 1000 microns) or, in various embodiments, within five or ten thousandths of an inch (≈125 to 250 microns) between the inner diameter 531 of the first boss 515 and the outer diameter 525 of the shaft 558 coupled to the hook 538. As explained further below, the sliding-fit tolerance between the inner diameter 529 of the recess 517 and the outer diameter 527 of the first boss 515 permit the two associated components (i.e., the bearing block 555 and the adjustment nut 556) to remain tightly and precisely aligned in an axial direction along the longitudinal axis A with minimal ability to move with respect to one another in a lateral direction with respect to the longitudinal axis A.

The press-fit tolerance and the sliding-fit tolerance values above defined enable a center point 533 of the hook 538 and a center point of a forward pin 546 (similar to the first pin 246 (or the forward pin) described above with reference to FIG. 2) to be maintained on the longitudinal axis A that extends along the latch mechanism 520. Maintaining this orientation serves to redistribute the load from the adjustment nut 556, through the bearing block 555, and to the structural elements and beams that make up the hook body 530. Maintaining the orientation also serves to tightly and precisely align the hook 538 and the shaft 558 with the hook body 530 along the longitudinal axis A, thereby preventing various moments or torques that might otherwise occur when loading a similar latch mechanism without the disclosed features of the bearing block 555. Reducing the moments or torques enables the loads experienced by the various components to be confined to pure (or substantially pure) axial loads, typically in tension, when the latch mechanism 520 is in a deployed state. The bearing block 555 and, in particular, the block load bearing plate 501, is configured to distribute the loads placed on it throughout the hook body load bearing plate 557, thus enabling the loads to be evenly distributed throughout the longitudinal beams, with the loads being primarily tensile loads in the axial direction without moments or torques placed on the beams. The load distribution facilitates smaller, lighter and more compact hook bodies to be incorporated into a latch mechanism. In addition, the disclosure saves cost associated with designing around tolerance stack-ups occurring between multiple apertures in a hook body, a bearing block without first and second bosses and an adjustment nut to maintain alignment of a shaft within the hook body, as all the tolerances are now essentially confined between the first boss 515 and the adjustment nut 556, the second boss 511 and the hook body load bearing plate 557 and between the first boss 515, the second boss 511 and the shaft 558, each of which may be more readily controlled without concern to tolerance stack-ups. Other advantages include the ability to eliminate threads on the shaft from being in a state of bearing (e.g., from being threaded into the hook body at one or more locations along a longitudinal axis while undergoing a tensile load) and consolidating the disclosed latch mechanism into having fewer components. As mentioned above, the second boss 511 also enables a substantial reduction or elimination of torques or moments with respect to the hook body 530, while both the first boss 515 and the second boss 511, in conjunction with the tolerances they provide with respect to adjoining components (e.g., the shaft 558 and the adjustment nut 556) precisely center the shaft 558 with respect to the longitudinal axis A and maintain a precise axial disposition of the shaft 558 with respect to the longitudinal axis A. A reduction or elimination of such torques or moments also serves to maintain minimum stress levels within the hook body 530, particularly at the portions where the hook body load bearing plate 557 adjoins other various members of the hook body 530. Additionally, the added bearing block bosses significantly reduces the stress at the hook body weakest section i.e., the hook body aperture by increasing the moment of inertia (I) through the critical section.

Note that while the foregoing disclosure describes a hook body comprising a plurality of elements, such as, for example, longitudinal beams, aft flanges, upper and lower plate members and load bearing plates, the disclosure contemplates embodiments where each of the various elements is incorporated into a single-piece, monolithic component when fabricated. Further, the disclosure contemplates embodiments where the longitudinal beams include the plate members as well as the aft flanges into single-piece, monolithic longitudinal members. In other words, the term longitudinal member may be construed to include each (or one or more of) of a plate, a longitudinal beam and an aft flange.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A latch mechanism, comprising:
   a hook body, the hook body having a hook body load bearing plate;
   a hook mechanism, the hook mechanism having a hook and a shaft connected to the hook, the shaft defining a longitudinal axis with respect to the hook body;
   an adjustment mechanism configured to adjust an axial position of the hook with respect to the hook body; and
   a bearing block, the bearing block having a block load bearing plate disposed between the adjustment mechanism and the hook body load bearing plate, the bearing block including a first boss configured for engagement with the adjustment mechanism;
   wherein the bearing block further comprises the first boss at an aft location configured to engage a recess that extends in an axial direction along the longitudinal axis into a first side of an adjustment nut of the adjustment mechanism and a second boss at a forward location configured to engage a plate aperture that extends axially through the hook body load bearing plate of the hook body;
   wherein the adjustment mechanism is locked or maintained in a position by a lock mechanism defined by a protrusion and an aperture with respect to the bearing block and that selectively prevents rotation of the adjustment nut about the longitudinal axis wherein a sliding-fit tolerance between an inner diameter of the recess and an outer diameter of the first boss permits a set of associated components comprising the bearing block and the adjustment nut to remain tightly and precisely aligned in the axial direction along the longitudinal axis with minimal ability to move with respect to one another in a lateral direction with respect to the longitudinal axis.

2. The latch mechanism of claim 1, wherein the hook body includes a plate aperture that extends in the axial direction through the hook body load bearing plate.

3. The latch mechanism of claim 2, wherein the bearing block includes the second boss configured for engagement with the plate aperture.

4. The latch mechanism of claim 3, wherein the second boss defines a second boss outer diameter, and the plate aperture defines a plate aperture inner diameter, the plate aperture inner diameter being within a press-fit tolerance of the second boss outer diameter.

5. The latch mechanism of claim 4, wherein the press-fit tolerance is between one or two thousandths of an inch.

6. The latch mechanism of claim 1, wherein the first boss is configured to engage the recess within the adjustment mechanism.

7. The latch mechanism of claim 6, wherein the adjustment mechanism includes the adjustment nut configured for threaded engagement with the shaft.

8. The latch mechanism of claim 7, wherein the bearing block includes the second boss, the second boss defining a second boss inner diameter and wherein the shaft defines a shaft outer diameter, the shaft outer diameter being within the sliding-fit tolerance of the second boss inner diameter.

9. The latch mechanism of claim 8, wherein the sliding tolerance is between five and ten thousandths of an inch.

10. The latch mechanism of claim 8, wherein the adjustment mechanism and the block load bearing plate are configured to provide the lock mechanism wherein the lock mechanism being configured to prevent rotation of the adjustment mechanism about the longitudinal axis.

11. A latch mechanism for an aircraft panel, comprising:
a hook body, the hook body including a plurality of longitudinal members, each of the plurality of longitudinal members extending in an axial direction with respect to the hook body, the hook body further having a hook body load bearing plate connected to the plurality of longitudinal members and being oriented perpendicular to the axial direction;
a hook mechanism, the hook mechanism having a hook and a shaft connected to the hook, the shaft extending in the axial direction with respect to the hook body;
an adjustment mechanism configured to adjust an axial position of the hook with respect to the hook body; and
a bearing block, the bearing block having a block load bearing plate disposed between the adjustment mechanism and the hook body load bearing plate;
wherein the bearing block further comprises a first boss at an aft location configured to engage a recess that extends in the axial direction along a longitudinal axis into a first side of an adjustment nut of the adjustment mechanism and a second boss at a forward location configured to engage a plate aperture that extends axially through the hook body load bearing plate of the hook body;
wherein the adjustment mechanism is locked or maintained in a position by a lock mechanism defined by a protrusion and an aperture with respect to the bearing block and that selectively prevents rotation of the adjustment nut about the longitudinal axis wherein a sliding-fit tolerance between an inner diameter of the recess and an outer diameter of the first boss permits a set of associated components comprising the bearing block and the adjustment nut to remain tightly and precisely aligned in the axial direction along the longitudinal axis with minimal ability to move with respect to one another in a lateral direction with respect to the longitudinal axis.

12. The latch mechanism of claim 11, wherein the hook body includes a plate aperture that extends in the axial direction through the hook body load bearing plate.

13. The latch mechanism of claim 12, wherein the bearing block includes a first boss comprising an aft boss configured to engage the recess that extends axially into the first side of the adjustment nut.

14. The latch mechanism of claim 13, wherein the first boss defines a first boss outer diameter configured to engage an interior surface of the recess of the adjustment nut and the plate aperture defines a plate aperture inner diameter, wherein the plate aperture inner diameter and the outer diameter of the second boss define a press-fit tolerance.

15. The latch mechanism of claim 14, wherein the press-fit tolerance is between one or two thousandths of an inch.

16. The latch mechanism of claim 15, wherein the bearing block includes the second boss configured for engagement with the adjustment mechanism.

17. The latch mechanism of claim 16, wherein the adjustment mechanism includes an adjustment nut configured for threaded engagement with the shaft.

18. The latch mechanism of claim 17, wherein the first boss defines a first boss inner diameter, and the shaft defines a shaft outer diameter, the shaft outer diameter being within the sliding-fit tolerance of the first boss inner diameter.

19. The latch mechanism of claim 18, wherein the sliding tolerance is between five and ten thousandths of an inch.

20. The latch mechanism of claim 19, wherein the adjustment mechanism and the block load bearing plate are configured to provide a lock mechanism, the lock mechanism being configured to prevent rotation of the adjustment mechanism about the axial direction.

* * * * *